US008547691B2

(12) United States Patent
Peng et al.

(10) Patent No.: US 8,547,691 B2
(45) Date of Patent: Oct. 1, 2013

(54) MOUNTING CLAMP FOR USB DEVICE AND MOTHERBOARD ASSEMBLY INCORPORATING THE SAME

(75) Inventors: Wen-Tang Peng, Taipei Hsien (TW); Zhe Zhang, Shenzhen (CN); Bing-Bao Guo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 389 days.

(21) Appl. No.: 12/979,311

(22) Filed: Dec. 27, 2010

(65) Prior Publication Data

US 2012/0147540 A1 Jun. 14, 2012

(30) Foreign Application Priority Data

Dec. 9, 2010 (CN) ....................... 2010 1 0580892.9

(51) Int. Cl.
*G06F 1/16* (2006.01)

(52) U.S. Cl.
USPC ......... 361/679.4; 361/809; 439/353; 439/362

(58) Field of Classification Search
USPC ................ 361/679.04, 679.31, 809; 439/135
See application file for complete search history.

(56) References Cited

U.S. PATENT DOCUMENTS

| | | | | |
|---|---|---|---|---|
| 6,533,612 | B1 * | 3/2003 | Lee et al. | 439/564 |
| 7,641,501 | B2 * | 1/2010 | Uchikawa et al. | 439/362 |
| 7,749,015 | B2 * | 7/2010 | Uchikawa et al. | 439/362 |
| 8,052,455 | B1 * | 11/2011 | Peng et al. | 439/353 |
| 8,100,710 | B1 * | 1/2012 | Peng et al. | 439/369 |
| 2009/0258539 | A1 * | 10/2009 | Zheng et al. | 439/607.41 |
| 2010/0041265 | A1 * | 2/2010 | Wang | 439/353 |
| 2012/0113612 | A1 * | 5/2012 | Peng et al. | 361/809 |

* cited by examiner

*Primary Examiner* — Lisa Lea Edmonds
(74) *Attorney, Agent, or Firm* — Altis & Wispro Law Group, Inc.

(57) ABSTRACT

A motherboard assembly includes a motherboard, a universal serial bus (USB) interface arranged on the motherboard. Also included is a USB device, a mounting seat and a cover. The USB device engages with the USB interface. The mounting seat is attached to the motherboard and enclosing the USB interface, and the cover is mounted to the mounting seat and resists against a top of the USB device to fasten the USB device to the USB interface.

18 Claims, 3 Drawing Sheets

MOUNTING CLAMP FOR USB DEVICE AND MOTHERBOARD ASSEMBLY INCORPORATING THE SAME

BACKGROUND

1. Technical Field

The present disclosure relates to a mounting clamp for universal serial bus (USB) devices and a motherboard assembly with the mounting clamp.

2. Description of Related Art

With advances in the computer technology, USB connectors have become a more popular way to connect peripheral devices. Some electronic devices inside the host computer use USB connectors, and a plurality of USB interfaces are formed on a motherboard to be electrically connected to the USB devices. However, some USB interfaces are perpendicularly formed on the motherboard, when the motherboard receives a jarring movement, the USB devices may easily become loose.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
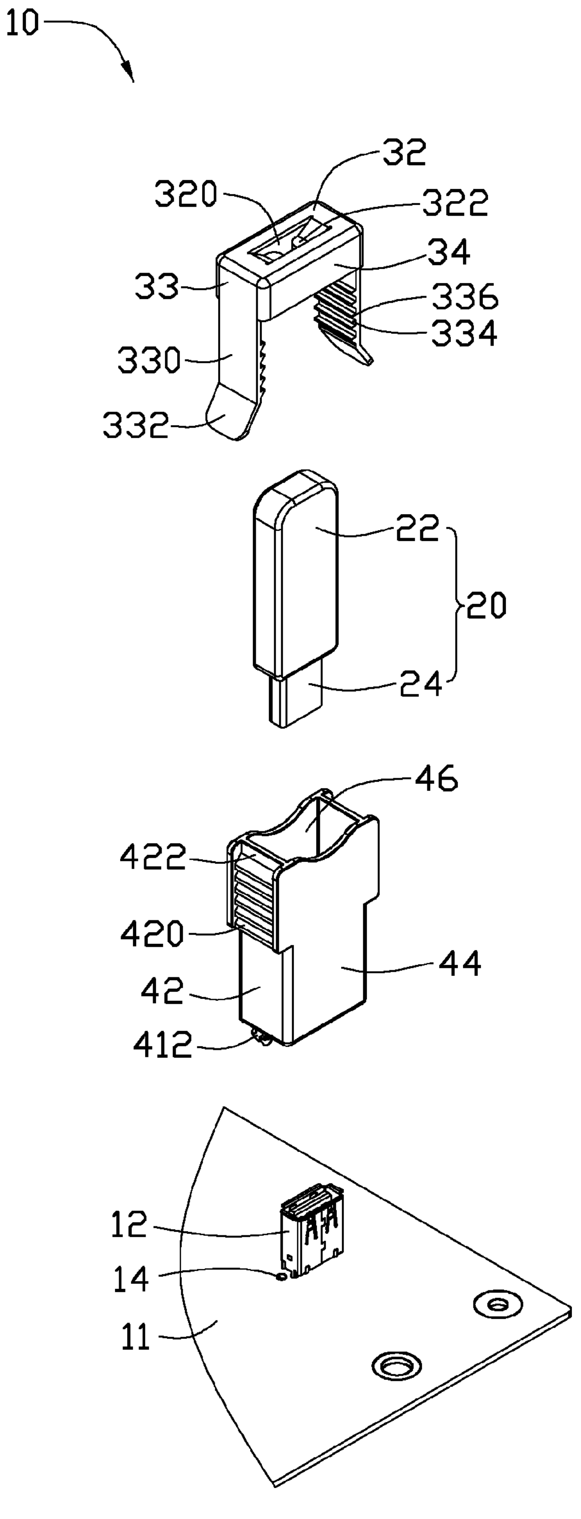
FIG. 1 is an exploded, isometric view of an exemplary embodiment of a mounting clamp for a universal serial bus (USB) device and a motherboard.
Figure 2:
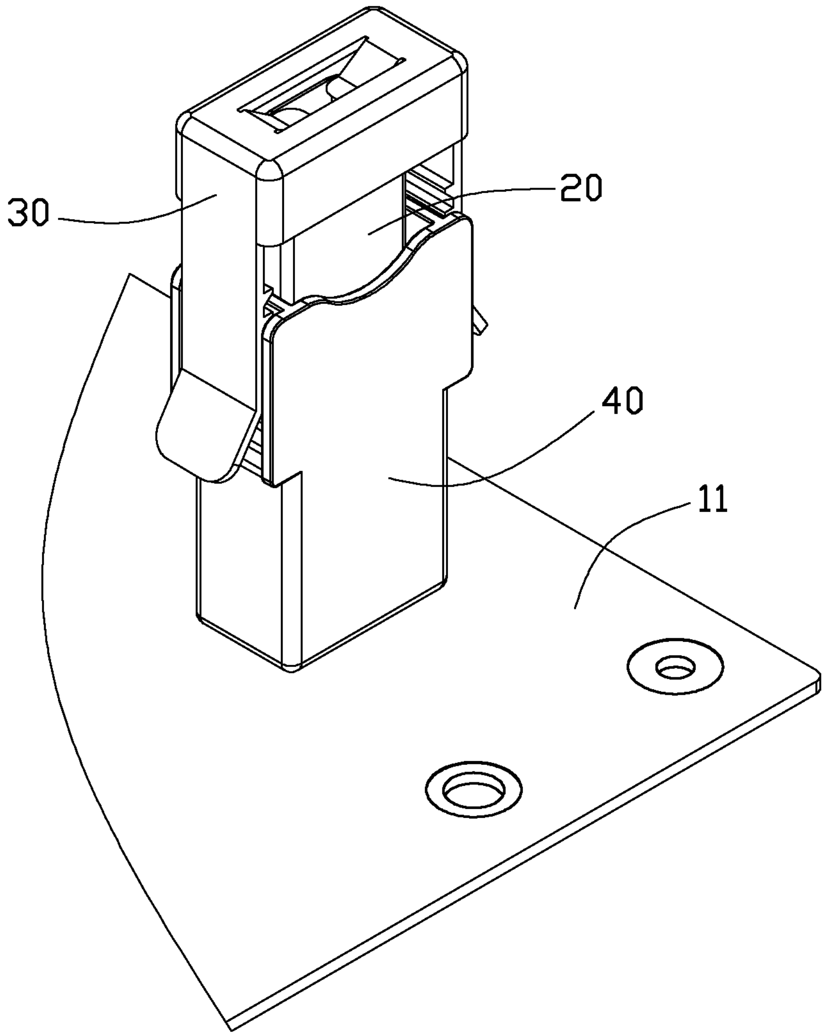
FIG. 2 is an assembled, isometric view of FIG. 1.

Referring to FIGS. 1 and 2, an exemplary embodiment of a mounting clamp 10 mounted on a motherboard 11 with a universal serial bus (USB) interface 12 arranged substantially perpendicularly on the motherboard 11. A USB device 20 electrically is connected to the USB interface 12. The mounting clamp 10 fasten the USB device 20 to the motherboard 11 to prevent the USB device 20 from loosening, and includes a cover 30 and a mounting seat 40.

The motherboard 11 defines two fastening holes 14 at opposite sides of the USB interface 12.

The USB device 20 includes a main body 22 and a USB connector 24 extending from one end of the main body 22.

The cover 30 includes a substantially rectangular top plate 32, two first lateral plates 33 extending down from opposite ends of the top plate 32, and two second lateral plates 34 extending down from opposite sides of the top plate 32. The top plate 32, the first lateral plates 33, and the second lateral plates 34 bind a receiving space 36 (shown in FIG. 3). The top plate 32 defines a substantially rectangular opening 320. Two elastic arms 322 slantingly extend down into the receiving space 36 from opposite sidewalls binding the opening 320, respectively adjacent to the first lateral plates 33. An elongated plate 330 extends down from a distal end of each first lateral plate 33. A plurality of first protrusions 334 extends from an inner side of each first lateral plate 33. A first latching slot 336 is defined between every two adjacent first protrusions 334. An operating tab 332 extends from a distal end of each elongated plate 330, away from the other elongated plate 330.

The mounting seat 40 is substantially T-shaped and includes a substantially rectangular bottom plate 41 (shown in FIG. 3), two first lateral plates 42 extending up from opposite ends of the bottom plate 41 and two substantially T-shape second lateral plates 44 extending up from opposite sides of the bottom plate 41. The bottom plate 41, the first lateral plates 42, and the second lateral plates 44 bind a receiving space 46. The bottom plate 41 defines a substantially rectangular opening 410 (shown in FIG. 3). Two hooks 412 extend down from the bottom plate 41 at opposite sides of the opening 410. A plurality of second protrusions 420 extends from an outer side of each first lateral plate 42. A second latching slot 422 is defined between every two adjacent second protrusions 420.

Figure 3:
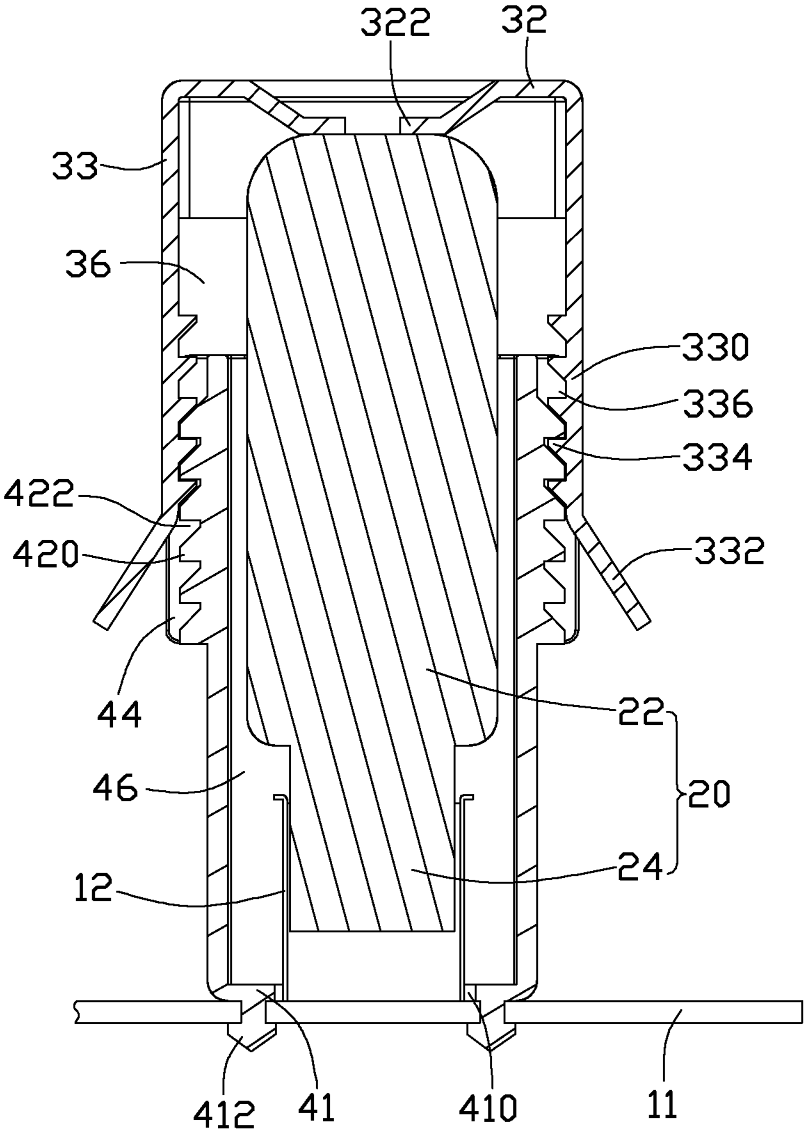
FIG. 3 is a sectional view of FIG. 2.

Referring to FIG. 3, in assembly, the opening 410 of the mounting seat 40 aligns with the USB interface 12, and the hooks 412 align with the fastening holes 14 of the motherboard 11. The USB interface 12 extends into the receiving space 46 of the mounting seat 40 through the opening 410. The hooks 412 are latched into the fastening holes 14 to tightly fasten the mounting seat 40 on the motherboard 10. The USB device 20 enters the receiving space 46 from a top of the mounting seat 40, with the USB connector 24 of the USB device 20 engaging with the USB interface 12. The cover 30 is attached to the mounting seat 40. The number of the first protrusions 334 and second protrusions 420 correspondingly latched into the second latching slots 422, according to the size of the USB device 20. The first latching slots 336 are adjusted, to allow the main body 22 to be received in the receiving space 36, the elastic arms 322 tightly resist against a top of the main body 22. Therefore, the cover 30 is tightly mounted to the mounting seat 40, and the USB device 20 is tightly mounted on the motherboard 11 by the mounting device, which can prevent the USB device 20 from becoming loose when the motherboard 10 has received a jarring movement. In this embodiment, the operating tabs 332 are convenient to be disengaged from the first and second protrusions 334 and 420 from the corresponding second and first latching slots 422 and 336, thereby allowing convenient assembling or disassembling of the cover 30.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

The invention claimed is:

1. A mounting clamp for fastening a universal serial bus (USB) device to a USB interface of a motherboard, the mounting device comprising:

a mounting seat attached to the motherboard and for enclosing the USB interface of the motherboard; and a cover selectively mounted to the mounting seat at different heights and for resisting against a top of the USB device engaged with the USB interface.

2. The mounting clamp of claim 1, wherein the cover comprises a top plate and two first lateral plates extending from opposite ends of the top plate, an elongated plate extends from a distal end of each first lateral plate, a plurality of first protrusions extends from an inner side of each elongated plate, the elongated plate defines a first latching slot between every two adjacent first protrusions; the mounting seat comprises a bottom plate and two second lateral plates extending opposite ends of the bottom plate, a plurality of second protrusions extends from an outer side of each second lateral plate, the second lateral plate defines a second latching slot between two adjacent second protrusions, the first protrusions and the first latching slots correspondingly engage with or partly engage with the second latching slots and the second protrusions.

3. The mounting clamp of claim 2, wherein the cover further comprises two third lateral plates extending down from opposite sides of the top plate, a receiving space is bounded by the top plate, the first and third lateral plates to receive an upper portion of the USB device.

4. The mounting clamp of claim 3, wherein two elastic arms extend down into the receiving space from the top plate to resist against the USB device.

5. The mounting clamp of claim 4, wherein the top plate defines an opening, the elastic arms are positioned at opposite sides of the opening.

6. The mounting clamp of claim 2, wherein the mounting device further comprises two third lateral plates extending down from opposite sides of the bottom plate, a receiving space is bounded by the bottom plate, the second and third lateral plates to receive the USB interface and a lower portion of the USB device.

7. The mounting device of claim 6, wherein the bottom plate defines an opening through which the USB interface extends.

8. The mounting clamp of claim 7, wherein two hooks extend down from the bottom plate of the mounting seat at opposite sides of the opening, to engage with the motherboard.

9. The mounting clamp of claim 2, wherein an operating tab extends from a distal end of each elongated plate, away from the other elongated plate.

10. A motherboard assembly comprising:

a motherboard;

a universal serial bus (USB) interface arranged on the motherboard;

a USB device engaging with the USB interface;

a mounting seat attached to the motherboard and enclosing the USB interface; and a cover selectively mounted to the mounting seat at different heights and resisting against a top of the USB device to fasten the USB device to the USB interface.

11. The motherboard assembly of claim 10, wherein the cover comprises a top plate and two first lateral plates extending down from opposite ends of the top plate, an elongated plate extends down from a distal end of each first lateral plate, a plurality of first protrusions extends from an inner side of each elongated plate, with a first latching slot defined between every two adjacent first protrusions; the mounting seat comprises a bottom plate and two second lateral plates extending down from opposite ends of the bottom plate, a plurality of second protrusions extends from an outer side of each first lateral plate, with a second latching slot defined between every two adjacent second protrusions, the first protrusions and the first latching slots correspondingly engage with or partly engage with the second latching slots and the second protrusions.

12. The motherboard assembly of claim 11, wherein the cover further comprises two third lateral plates extending down from opposite sides of the top plate, a receiving space is bounded by the top plate, the first and third lateral plates to receive the USB device.

13. The motherboard assembly of claim 12, wherein two elastic arms extend down from the top plate to resist against the USB device.

14. The motherboard assembly of claim 13, wherein the top plate defines an opening, the elastic arms are positioned at opposite side of the opening.

15. The motherboard assembly of claim 11, wherein the mounting device further comprises two third lateral plates extending down from opposite sides of the bottom plate, a receiving space is bounded by the bottom plate, the second and third lateral plates to receive the USB interface and the USB device.

16. The motherboard assembly of claim 15, wherein the bottom plate defines an opening through which the USB interface extends.

17. The motherboard assembly of claim 16, wherein two hooks extend down from the bottom plate of the mounting seat at opposite sides of the opening, and the motherboard defines two fastening holes at opposite sides of the USB interface, the hooks are latched to the fastening holes to fasten the mounting seat to the motherboard.

18. The motherboard assembly of claim 11, wherein an operating tab extends from a distal end of each elongated plate, away from the other elongated plate.

* * * * *